United States Patent
Johnson et al.

(10) Patent No.: US 11,545,010 B1
(45) Date of Patent: Jan. 3, 2023

(54) PRINTER APPARATUS INCLUDING PAPER MEDIUM INCLUDING BACKING STRIP AND ADHESIVE LABEL AFFIXED THERETO

(71) Applicant: AMERICAN AIRLINES, INC., Fort Worth, TX (US)

(72) Inventors: Jeffrey Charles Johnson, Roanoke, TX (US); Arunprakash Dhanabal, Irving, TX (US)

(73) Assignee: AMERICAN AIRLINES, INC., Fort Worth, TX (US)

( * ) Notice: Subject to any disclaimer, the term of this patent is extended or adjusted under 35 U.S.C. 154(b) by 1111 days.

(21) Appl. No.: 15/916,583

(22) Filed: Mar. 9, 2018

Related U.S. Application Data

(63) Continuation of application No. 12/752,625, filed on Apr. 1, 2010, now abandoned.

(51) Int. Cl.
*G07G 1/00* (2006.01)
*B41J 3/407* (2006.01)

(52) U.S. Cl.
CPC .......... *G07G 1/0018* (2013.01); *B41J 3/4075* (2013.01)

(58) Field of Classification Search
CPC ....... G06Q 10/02; G06Q 50/14; B41J 3/4075; G07G 1/0018
USPC ...................... 705/5, 1.1; 235/384
See application file for complete search history.

(56) References Cited

U.S. PATENT DOCUMENTS

| | | | |
|---|---|---|---|
| 4,240,862 A | 12/1980 | Ishiyama | |
| 4,631,845 A | 12/1986 | Samuel et al. | |
| 4,882,861 A * | 11/1989 | Holmes | G09F 3/02 40/6 |
| 4,916,841 A * | 4/1990 | Dawson | G09F 3/10 40/6 |
| 5,051,565 A | 9/1991 | Wolfram | |
| 5,366,249 A | 11/1994 | Diemert | |
| 5,401,944 A | 3/1995 | Bravman et al. | |
| 5,707,082 A * | 1/1998 | Murphy | B41J 2/325 283/114 |
| 6,295,747 B1 * | 10/2001 | Francis | G09F 3/02 283/81 |
| 6,540,122 B1 * | 4/2003 | Petersen | A45F 5/02 224/197 |

(Continued)

FOREIGN PATENT DOCUMENTS

EP 0600622 6/1994

OTHER PUBLICATIONS

Katie Chase ("Airline Tests Mobile Bag Check-in," Jul. 24, 2009. http://archive.boston.com/travel/articles/2009/07/24/ airline_tests_ mobile_ bag_check_in/) (Year: 2009).*

(Continued)

*Primary Examiner* — Sarah M Monfeldt
*Assistant Examiner* — John S. Wasaff
(74) *Attorney, Agent, or Firm* — Haynes and Boone, LLP

(57) ABSTRACT

A printer apparatus includes a wearable housing and a paper medium disposed therein, the paper medium including an adhesive label and a backing strip to which the adhesive label is affixed. The adhesive label includes first, second, and third portions affixed to the backing strip, wherein each of the first, second, and third portions is permitted to be peeled off from the backing strip while the others of the first, second, and third portions remain affixed to the backing strip.

6 Claims, 12 Drawing Sheets

(56) References Cited

U.S. PATENT DOCUMENTS

| | | | |
|---|---|---|---|
| 6,735,575 B1 | 5/2004 | Kara | |
| 6,736,322 B2 | 5/2004 | Gobburu et al. | |
| 7,322,613 B2 | 1/2008 | Penuela | |
| 7,406,467 B1* | 7/2008 | White | G06Q 10/02 705/5 |
| 8,567,674 B2* | 10/2013 | Conaghan | G09F 3/10 235/384 |
| 8,881,438 B2 | 11/2014 | Shimizu | |
| 2003/0184782 A1* | 10/2003 | Perkins | G06F 3/1225 358/1.13 |
| 2005/0037172 A1* | 2/2005 | Adams | G09F 3/0288 428/40.1 |
| 2005/0251430 A1* | 11/2005 | Jindel | G06Q 30/0283 705/5 |
| 2008/0296886 A1* | 12/2008 | Minor | G09F 3/10 283/80 |
| 2008/0313088 A1 | 12/2008 | Cahn | |
| 2009/0173784 A1* | 7/2009 | Yang | G06Q 20/40 235/380 |
| 2009/0276089 A1 | 11/2009 | Bartholomew | |
| 2010/0078475 A1* | 4/2010 | Lin | G06Q 50/14 235/380 |
| 2011/0054952 A1* | 3/2011 | Mateer | G06Q 10/02 705/5 |
| 2011/0054953 A1* | 3/2011 | Mehl | G06Q 10/02 705/5 |
| 2013/0219759 A1* | 8/2013 | Kimes | B31D 1/027 40/6 |

OTHER PUBLICATIONS

15916583 EIC 3600 Search Report 022321 (Year: 2021).*
Office Action issued by the USPTO regarding U.S. Appl. No. 12/752,625 dated Jun. 9, 2014.
Final Office Action issued by the USPTO regarding U.S. Appl. No. 12/752,625 dated Aug. 30, 2014.
Office Action issued by the USPTO regarding U.S. Appl. No. 12/752,625 dated Oct. 5, 2016.
Final Office Action issued by the USPTO regarding U.S. Appl. No. 12/752,625 dated Mar. 9, 2017.
Office Action issued by the USPTO regarding U.S. Appl. No. 12/752,625 dated Sep. 18, 2017.

* cited by examiner

PRINTER APPARATUS INCLUDING PAPER MEDIUM INCLUDING BACKING STRIP AND ADHESIVE LABEL AFFIXED THERETO

This application is a continuation of prior U.S. application Ser. No. 12/752,625, filed on Apr. 1, 2010.

BRIEF DESCRIPTION OF THE DRAWINGS

FIG. 3B is a screenshot from the user interface of the portable computing device, according to an exemplary embodiment.

FIG. 3C is another screenshot from the user interface of the portable computing device, according to an exemplary embodiment.

DETAILED DESCRIPTION

Figure 1:
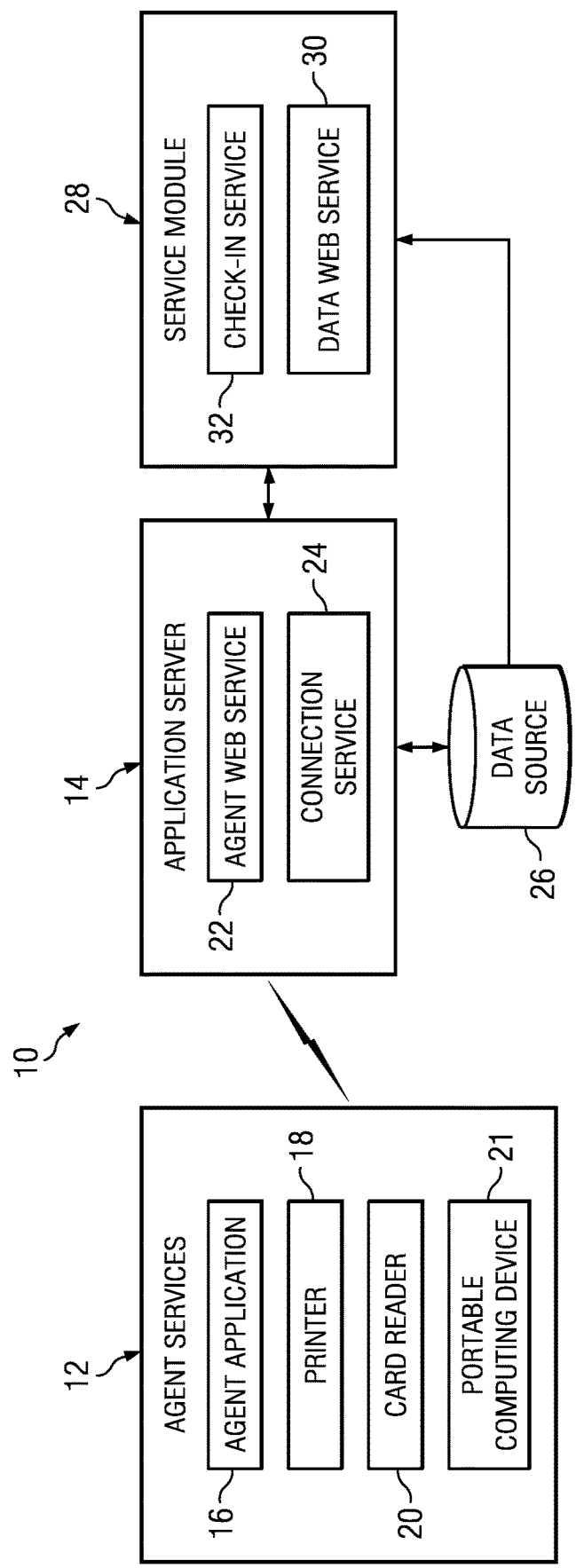
FIG. 1 is a diagrammatic illustration of a system according to an exemplary embodiment, the system including an agent services module that includes a printer, a card reader, and a portable computing device.

In an exemplary embodiment, as illustrated in FIG. 1, a system for processing passengers and baggage associated with the passengers is generally referred to by the reference numeral 10 and includes an agent services module 12 operably coupled to, and in communication with, an application server module 14. The agent module 12 includes an agent application 16, a portable printer 18, a card reader 20, and a handheld or portable computing device 21. The application server module 14 includes an agent web service 22 and a connection service 24. A data source 26 is operably coupled to, and in communication with, the application server module 14. A service module 28 is also operably coupled to, and in communication with, the application server module 14. The service module 28 includes a data web service 30 and a check-in service 32. The service module 28 is also operably coupled to, and in communication with, the data source 26.

In several exemplary embodiments, one or more of the agent services module 12, the application server module 14, the data source 26, and the service module 28 are in two-way communication, one-way communication, and/or in wireless communication. In several exemplary embodiments, the agent services module 12, the application server module 14, the data source 26, and the service module 28 are in communication via a network, such as, for example, the Internet, any type of local area network, any type of wide area network, any type of voice network, any type of data network, and/or any combination thereof.

In several exemplary embodiments, the agent services module 12, the application server module 14, the data source 26, and the service module 28 include a computer readable medium or memory having a plurality of instructions stored therein, which instructions are accessible to, and executable by, a processor. In several exemplary embodiments, one or more of the agent services module 12, the application server module 14, the data source 26, and the service module 28 include one or more data structures or databases, which databases are accessible to a processor. In several exemplary embodiments, the agent services module 12, the application server module 14, the data source 26, and the service module 28 include a processor, a computer readable medium or memory operably coupled to the processor, a plurality of instructions stored in the computer readable medium and accessible to, and executable by, the processor, and one or more data structures or databases stored in the computer readable medium and accessible to the processor.

The data source 26 provides data collection and management functionality in the system 10. The data source 26 collects and stores data from multiple sources and provides this data to the application server module 14 and the service module 28. In several exemplary embodiments, the data collected by the data source 26 includes passenger, ticketing, and flight data that include one or more of the following: passenger names, passport information, visa information, passenger billing information, passenger security information, passenger connections, stand-by information, travel times, gate assignments, upgrade availabilities, seat availabilities, vehicle load factors, baggage counts, and messages. In an exemplary embodiment, the data source 26 is accessible to any of the agent services module 12, the application server module 14, and the service module 28.

In some exemplary embodiments, updates to the agent services module 12 are pushed to one or more of the data source 26, the application server module 14, and the service module 28. In several exemplary embodiments, the application server module 14 sends and receives travel data from the data source 26 at regular intervals so that the application server module 14 and the data source 26 are updated and synchronized in near real-time. In several exemplary embodiments, the data source 26 may receive updates from external applications in communication with the data source 26. In several exemplary embodiments, the application server module 14 receives data from the agent application 16 stored in the agent services module 12 and updates the data source 26 according to the received data.

In several exemplary embodiments, the data source 26 is a lightweight directory access protocol for querying and modifying data using directory service running over TCP/IP and/or an Oracle database. In several exemplary embodiments, the check-in service 32 is a computer reservation system used by an airline, railway, hotel, or travel agents, such as Sabre. In several exemplary embodiments, the data web service 30 is a service that manages and provides data associated with travel routes.

In an exemplary embodiment, the printer 18 is a lightweight portable label printer that is associated with a paper medium such as, for example, an adhesive label and a backing strip to which the adhesive label is affixed. In several exemplary embodiments, instead of, or in addition to a backing strip and an adhesive label affixed thereto, the printer 18 is associated with another paper medium such as, for example, printer paper, copier paper, thermal paper, and/or any combination thereof.

In several exemplary embodiments, the printer 18 includes the card reader 20, which, in turn, includes a magnetic stripe scanner. In an exemplary embodiment, the printer 18 is a Datamax-O'Neil® OC3 printer. In several exemplary embodiments, the printer 18 is in two-way communication or one-way communication with the portable computing device 21. In several exemplary embodiments, the printer 18 is in wireless communication with the portable computing device 21 over, for example, short length radio waves. In several exemplary embodiments, the communication between the printer 18 and the portable computing device 21 is secured by an encryption protocol. In an exemplary embodiment, the printer 18 is attached by a printer cable or a universal serial bus cable to the portable computing device 21. In other exemplary embodiments, the printer 18 has a built-in network interface, such as a wireless network interface.

The card reader 20 is in communication with the portable computing device 21 and/or the printer 18. In several exemplary embodiments, the card reader 20 is incorporated into the portable computing device 21. In an exemplary embodiment, the card reader 20 includes a magnetic stripe scanner. In several exemplary embodiments, the card reader 20 and the portable computing device 21 are a single unit. In other embodiments, the card reader 20 and the portable computing device 21 are separate units in wired or wireless communication with one another.

The portable computing device 21 includes a processor, a computer readable medium having a plurality of instructions stored therein for execution by the processor, a user interface and an input device, such as softkeys, a stylus, or a touchscreen. In an exemplary embodiment, the portable computing device 21 is a personal digital assistant. In an exemplary embodiment, the portable computing device 21 is a Motorola® MC75 personal digital assistant.

Figure 2:
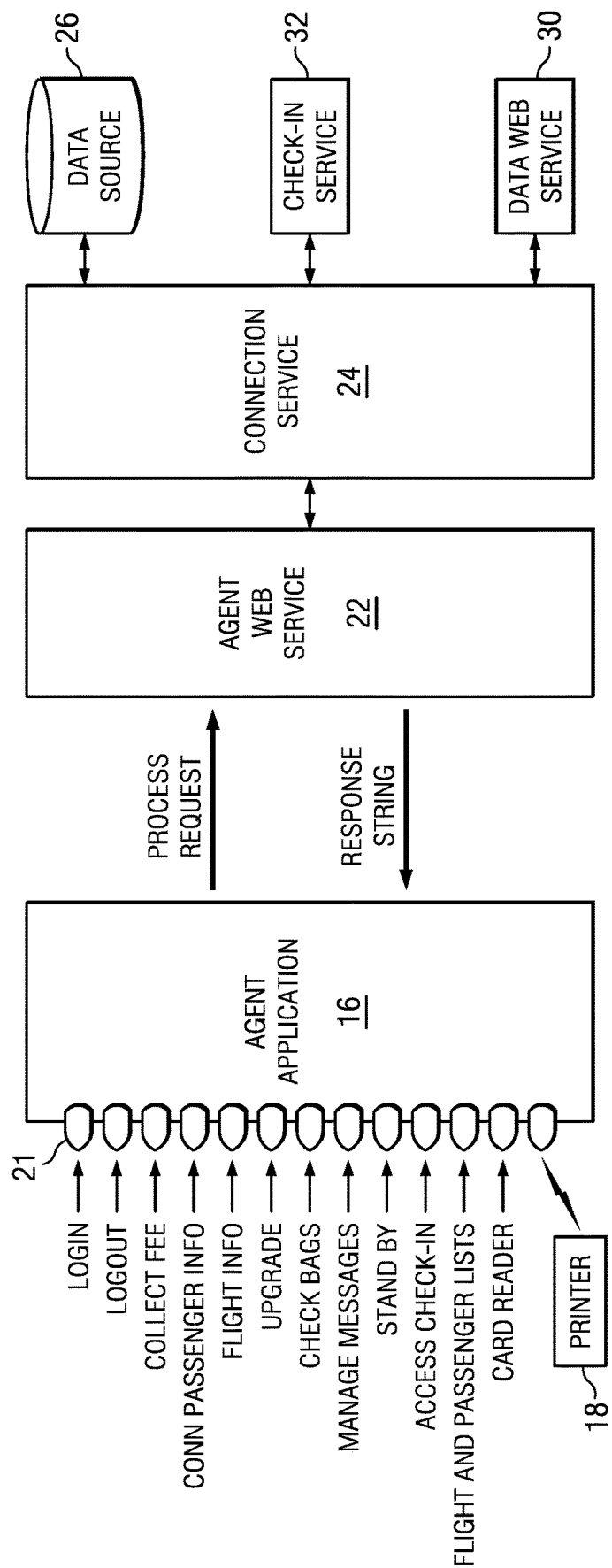
FIG. 2 is a diagrammatic illustration of an exemplary software architecture for the system of FIG. 1.

In an exemplary embodiment, as illustrated in FIG. 2 with continuing reference to FIG. 1, the agent application 16, via the portable computing device 21, can accept inputs such as: Login, Logout, Collect Fee, Retrieve Passenger Information, Retrieve Flight Information, Upgrade, Check Bags, Manage Messages, Stand By, Access the Check-In Service 32, Retrieve Flight List, Retrieve Passenger List, Activate the Card Reader 20, and Activate the Printer 18.

The agent application 16 is loaded on the portable computing device 21, and is operably coupled to and in communication with the agent web service 22, the printer 18, and the card reader 20. In an exemplary embodiment, the agent web service 22 is in two-way communication and/or wireless communication with the agent application 16 via the connection service 24. The agent web service 22 is in two-way communication with one or more of the data source 26, the data web service 30, and the check-in service 32 via the connection service 24. In several exemplary embodiments, the connection service 24 operably couples the agent web service 22 to one or more of the data source 26, the data web service 30, and the check-in service 32 via a network, such as, for example, the Internet, any type of local area network, any type of wide area network, any type of wireless network, any type of voice network, any type of data network, and/or any combination thereof.

Figure 3A:
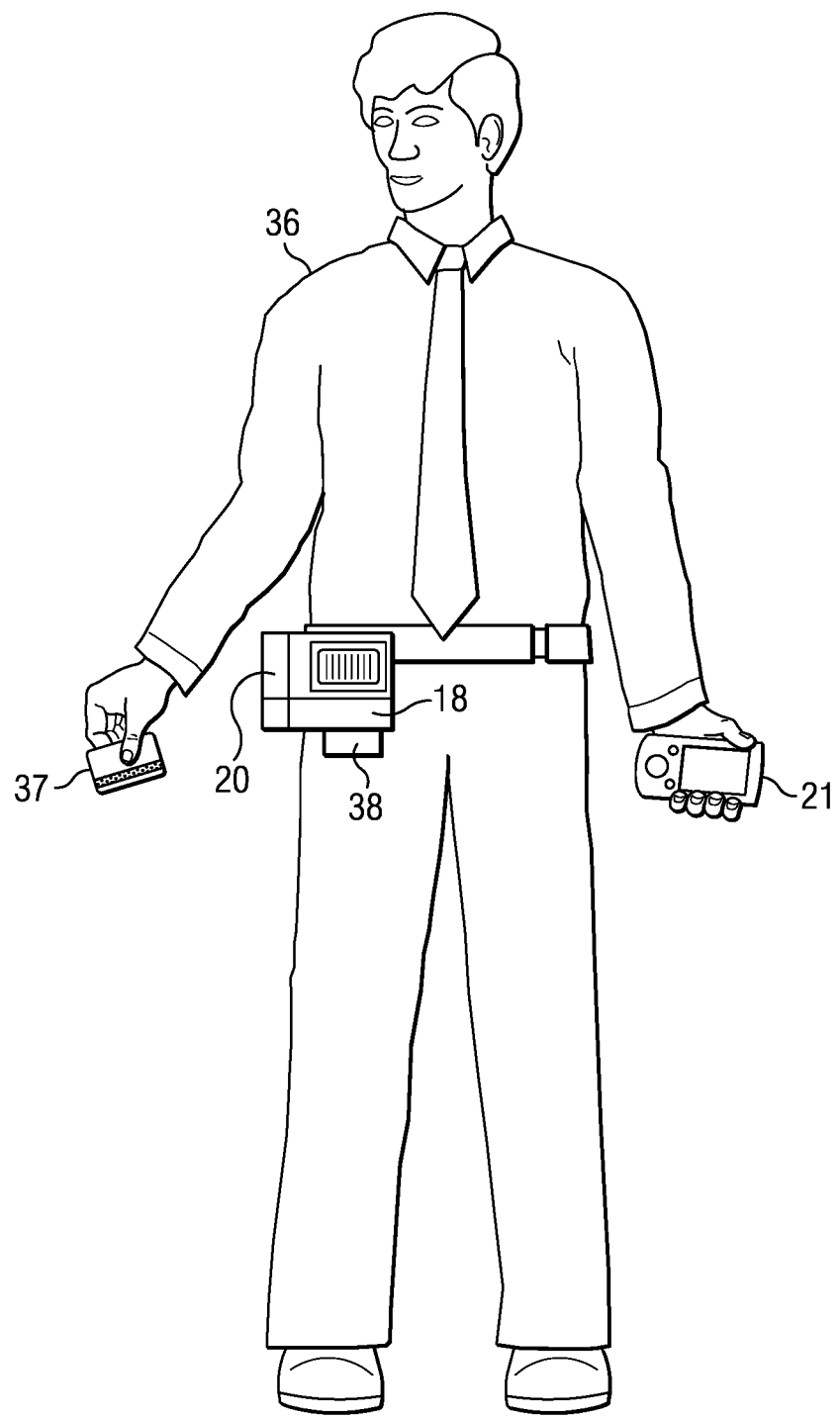
FIG. 3A is a diagrammatic illustration of at least a portion of the system of FIG. 1 according to an exemplary embodiment, the portion being controlled by a ticket agent and including the portable computing device, the card reader, and the printer.

Referring now to FIG. 3A, during operation in an exemplary embodiment, the agent application 16 is loaded and installed onto the portable computing device 21, which is handled by a ticket agent 36.

The agent application 16 provides operational information and decision support to the ticket agent 36. In an exemplary embodiment, the agent application 16 allows the ticket agent 36 to check-in passengers and baggage from remote locations away from a ticketing counter or self-serve check-in kiosk, such as, for example, a car valet line at the airport, an airport parking lot, or a location outside of an airport such as a home or office. The portable computing device 21 allows the ticket agent 36 to remotely login and logout of the agent web service 22 and the data source 26. The portable computing device 21 allows the ticket agent 36 to receive electronic messages, load flight information, offer upgrades, offer drink tickets, offer meal tickets, and collect fees from passengers at locations remote from a ticketing counter. The portable computing device 21 allows the passenger to check-in for travel, check bags, choose seats, purchase upgrades, and receive drink and/or meal tickets without approaching a ticking counter or self-serve kiosk.

In an exemplary embodiment, the portable computing device 21 provides the ticket agent 36 with a view of relevant passenger, ticketing, and flight data stored on the data source 26. The portable computing device 21 receives data from the data source 26 via the application server module 14. In an exemplary embodiment, the passenger, ticketing, and flight data is updated on request in near real-time from the agent web service 22 on the application server module 14. In an exemplary embodiment, the passenger data includes passenger names, passport information, visa information, club member identification numbers, passenger number records, connecting flight information, and baggage information. In an exemplary embodiment, the portable computing device 21 also retrieves or accesses passenger, ticketing, and flight data stored on the application server 14. In an exemplary embodiment, the ticketing data includes departure times, seat assignments, gate information, messages to ticket agents about flights that are experiencing some type of disruption (such as delays, mechanical problems, or crew problems), and baggage information. In an exemplary embodiment, the flight information includes departure times, arrival times, flight plans, gate information, upgrade purchase options for passengers, and connecting passenger information.

The portable computing device 21 captures and sends check-in data to the data source 26 for several passengers and pieces of baggage on a given flight and alerts the ticket agent 36 if a flight disruption is expected for the passenger currently checking-in.

In several exemplary embodiments, the printer 18 produces a hard copy (permanent readable text and/or graphics) of the data stored in electronic form on, and/or transmitted by, the portable computing device 21. In an exemplary embodiment, this hard copy is printed on a continuous feed of adhesive label affixed to a backing strip. The printer 18 creates a unitary printout 38 to be given to the passenger that contains one or more baggage claim tags, baggage identification tags, baggage payment or fee receipts, and boarding passes (shown in FIG. 4).

The ticket agent 36 swipes a payment card 37 such as, for example, a credit card or debit card, provided by a passenger through the card reader 20 in order to charge that passenger for any ticket upgrades, seat changes, and checked baggage.

Figures 3B, 3C:
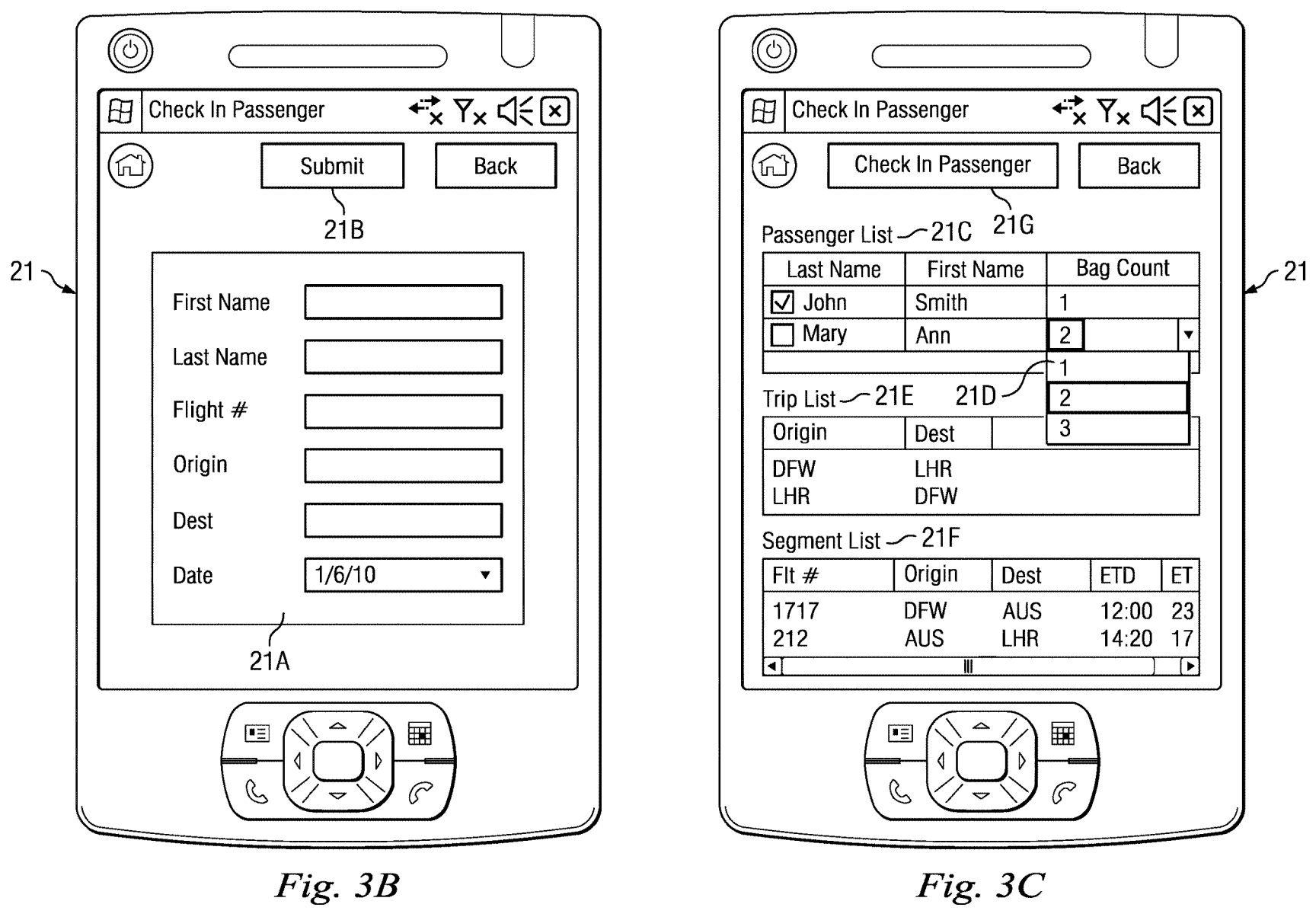

Referring now to FIG. 3B, the user interface of the portable computing device 21 is displayed to the ticket agent 36. The user interface allows the ticket agent 36 to log onto the agent application 16 and to enter the passenger's identification information in the text boxes 21A. In one embodiment, the passenger's identification information is scanned directly into the portable computing device 21 from the passenger's passport, driver's license, frequent flyer membership card, or other type of identification document by a scanner that is part of or otherwise in communication with the portable computing device 21. The scanned identification is loaded automatically into the text boxes 21A. A button 21B is clicked or otherwise selected, thereby sending the passenger information from the boxes 21A to the agent web service 22 to be matched with passenger data stored in the data source 26.

Referring now to FIG. 3C, the relevant passenger travel information is retrieved from the data source 26 and displayed on the user interface of the portable computing device 21. In an exemplary embodiment, the user interface displays a passenger list 21C containing the first and last name of the passenger. The list 21C also contains a drop down list 21D, which allows the ticket agent 36 to select the number of bags the passenger will check. In an exemplary embodiment, the user interface displays a list 21E, which contains the origin and destination locations associated with the passenger's complete travel plans. In an exemplary embodiment, the user interface displays a list 21F containing the flight(s) the passenger will be taking to reach his or her destination, along with the flight(s) estimated times of departure and/or arrival. A button 21G is clicked or otherwise selected, thereby sending a command to the check-in service 32 to check in the passenger for the passenger's flight(s).

Figure 3E:
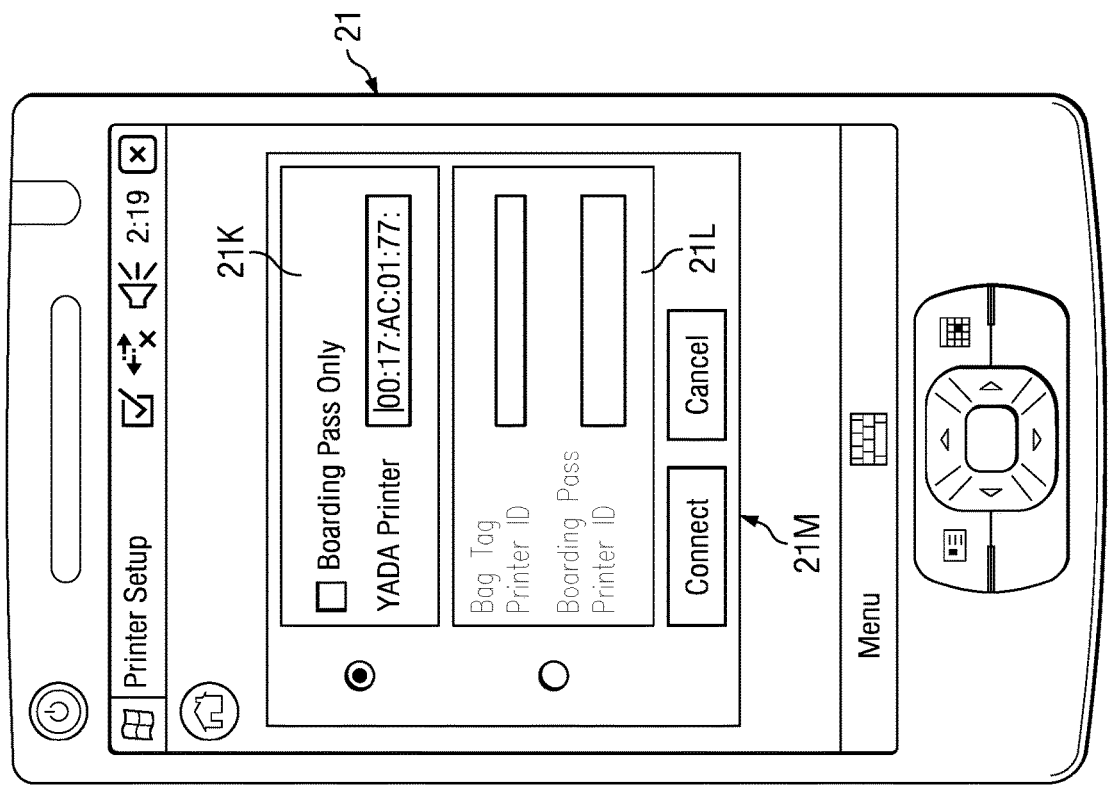
FIG. 3E is still yet another screenshot from the user interface of the portable computing device, according to an exemplary embodiment.
Figure 3D:
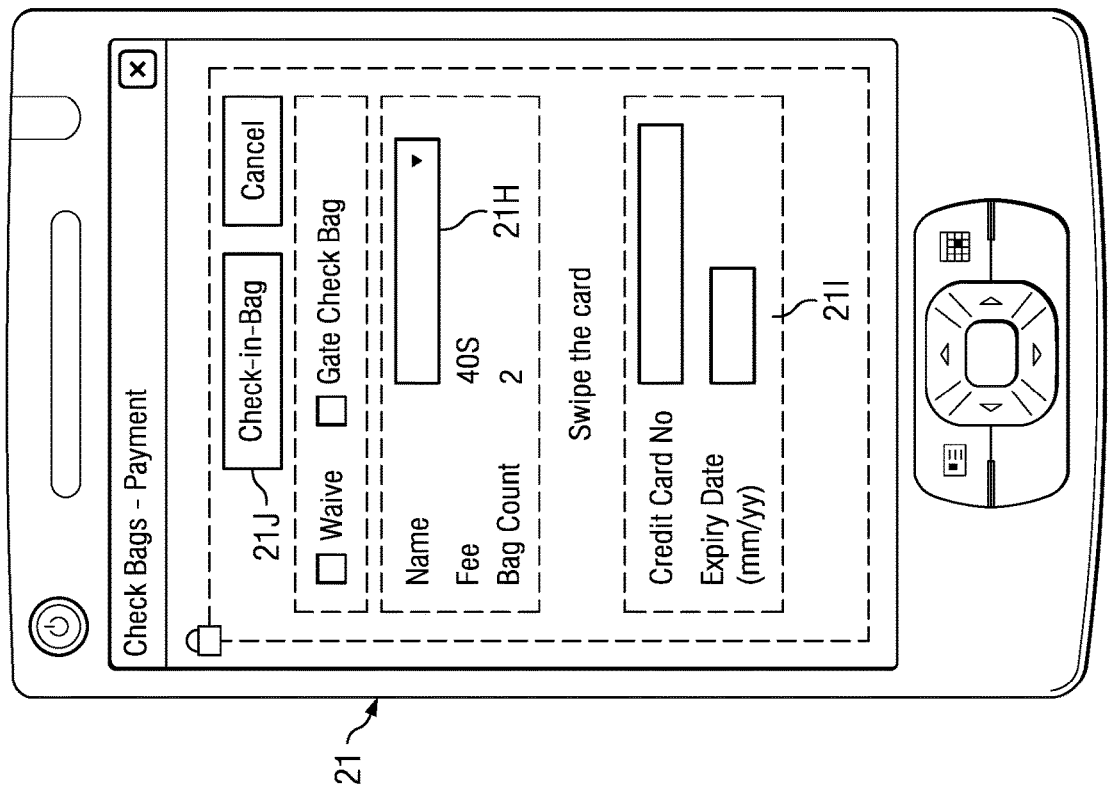
FIG. 3D is yet another screenshot from the portable computing device, according to an exemplary embodiment.

Referring now to FIG. 3D, the user interface of the portable computing device 21 gives the option to the ticket agent 36 to charge for checked baggage, waive a checked baggage fee, or gate-check baggage. More particularly, the user interface displays a drop down list 21H, which allows the ticket agent to select from a list of passengers to charge for checked baggage. Further, the user interface displays a box 21I, which shows the credit card number and expiration date associated with the charge for the checked baggage. In an exemplary embodiment, this credit card data is obtained from the credit card 37 by swiping the credit card 37 into the portable card reader 20. A button 21J is clicked or otherwise selected, sending a command to the agent web service 22 to update the passenger information stored in the data source 26 with the check baggage information.

Referring now to FIG. 3E, the user interface of the portable computing device 21 displays a box 21K, which shows the network address or other identifier associated with the printer 18. The box 21K may also display a check box that may be manipulated by the ticked agent 36 based on whether or not baggage has been checked. In an exemplary embodiment, if the check box in box 21K is not activated, the printer 18 will not print the baggage identification tags or claim tags portions of the printout given to the passenger. In an exemplary embodiment, the user interface displays a box 21L, which allows the ticket agent 36 to select a printer other than the printer 18 associated with the ticket agent 36; for example, a printer associated with another ticket agent. A button 21M is clicked or otherwise selected, sending a command to the printer 18 to print a receipt for the credit card transaction, print one or more baggage claim tags, print one or more baggage identification tags, a boarding pass, and/or any combination thereof for the passenger.

Figure 4:
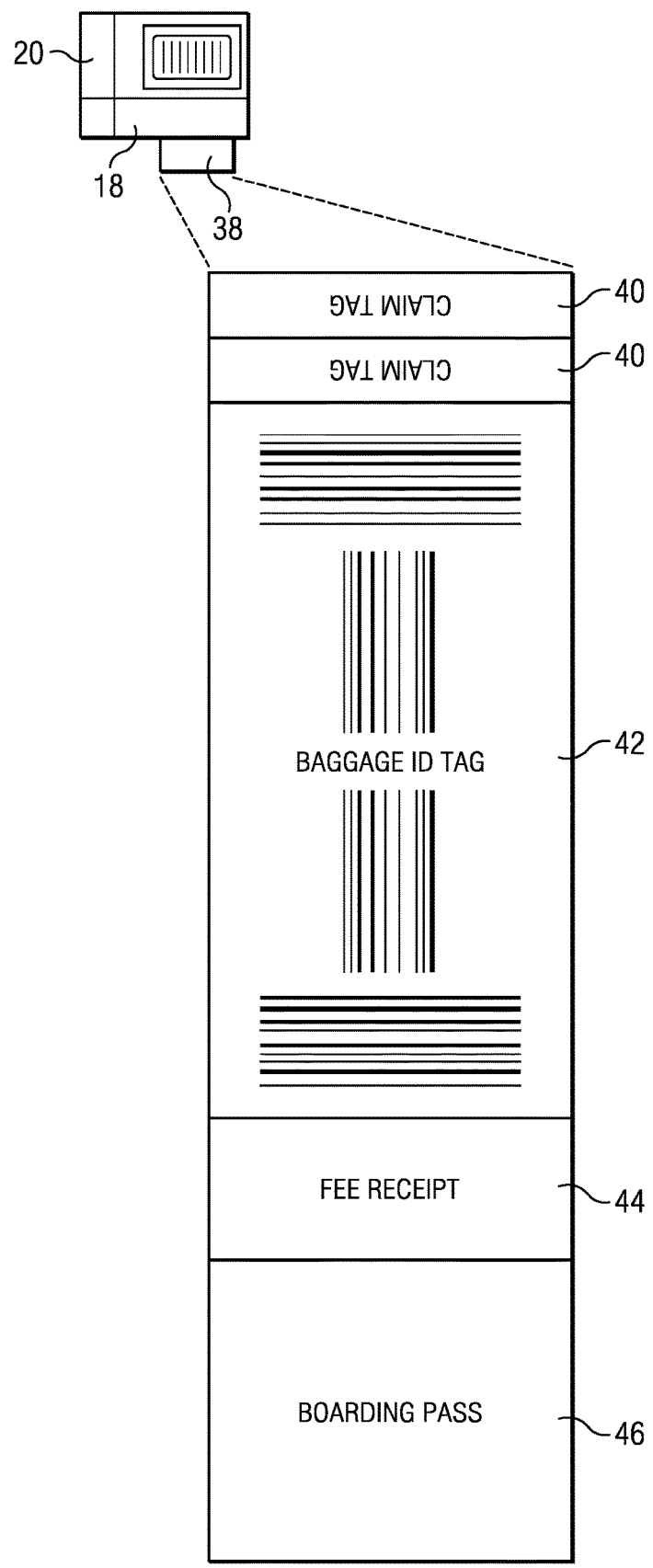
FIG. 4 is a diagrammatic illustration of the printer of FIG. 3A and a unitary printout created by the printer, according to an exemplary embodiment.

Referring now to FIG. 4, a unitary printout 38 is created by the printer 18, the unitary printout 38 including: one or more baggage claim tags 40, a baggage identification tag 42, a baggage payment or fee receipt 44, and a boarding pass 46. If more than one baggage piece is checked by a passenger, more than one baggage claim tag 40 is included on the unitary printout 38, and the printer 18 may print additional baggage identification tags 42 on the unitary printout 38, or on separate printouts.

In several exemplary embodiments, each of the one or more baggage claim tags 40, the baggage identification tag 42, the baggage payment or fee receipt 44, and the boarding pass 46 includes machine readable code, such as a bar code, and these codes are printed by the printer 18. In an exemplary embodiment, a least a portion of the machine readable code provides identical information when read from one of the baggage claim tags 40, the baggage identification tag 42, the fee receipt 44, or the boarding pass 46. The machine readable code on the boarding pass 46 is designed to be machine-scanned at the vehicle boarding point, authorizing the passenger to board the vehicle. The machine readable code on the baggage identification tag 42 is designed to be scanned and read at the vehicle baggage loading point. The machine readable code on the one or more baggage claim tags 40 is designed to be scanned and read at the vehicle loading point or baggage pick-up point to match passengers with their baggage. In several exemplary embodiments, instead of, or in addition to machine readable code, each of the one or more baggage claim tags 40, the baggage identification tag 42, the baggage payment or fee receipt 44, and the boarding pass 46 includes other data such as, for example, other code, graphics, text, and/or any combination thereof, all of which, or one or more portions of which, are included on the unitary printout 38.

As shown in FIG. 4, the baggage claim tags 40, the baggage identification tag 42, the baggage payment or fee receipt 44, and the boarding pass 46 are printed on respective portions of the paper medium. In several exemplary embodiments, the paper medium includes an adhesive affixed to a backing strip so that the baggage claim tags 40, the baggage identification tag 42, the baggage payment or fee receipt 44, and the boarding pass 46 are printed on respective portions of the adhesive label, with any one of the portions being permitted to be peeled off from the backing strip while the remaining portions remain affixed to the backing strip. In several exemplary embodiments, perforations in the adhesive label, cuts in the adhesive label, lines printed on the adhesive label, and/or any combination thereof, define the respective portions of the adhesive of the unitary printout 38 on which the baggage claim tags 40, the baggage identification tag 42, the baggage payment or fee receipt 44, and the boarding pass 46 are printed.

In an exemplary embodiment, the boarding pass 46 on the unitary printout 38 includes a seat assignment printed thereon, a machine readable code printed thereon, that represents a seat assignment, and/or any combination thereof.

Figure 5:
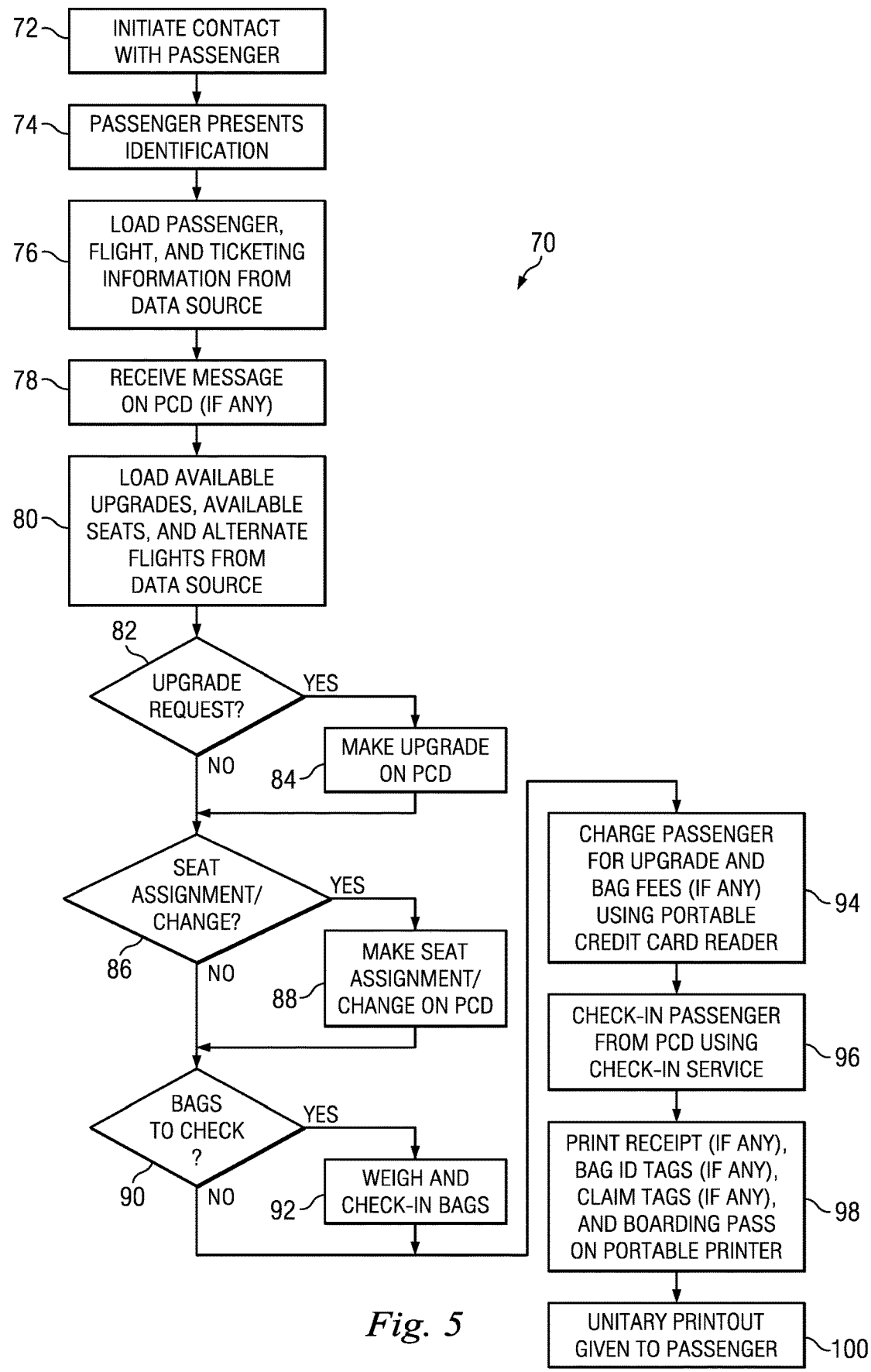
FIG. 5 is a flow chart illustration of a passenger and baggage handling process conducted using the system of FIG. 1 and the ticket agent of FIG. 3, according to an exemplary embodiment.

Referring now to FIG. 5, with continuing reference to FIGS. 1-4, an example operational process 70 using the system 10 for handling passengers and baggage for vehicle travel in one embodiment is shown. At step 72, a passenger arrives at a terminal and engages a ticket agent 36 at a check-in position. The passenger may be pre-ticketed or may need to purchase a ticket for travel. The passenger may arrive with baggage associated with the passenger, including baggage to be checked, potential checked baggage, or carry-on baggage. At step 74, the passenger presents identification to the ticket agent 36. In one embodiment, the ticket agent 36 logs onto the agent application 16 using the user interface of the portable computing device 21 and enters the passenger's identification information. In another embodiment, the passenger's identification information is scanned directly into the portable computing device 21 from the passenger's identification by a scanner that is part of and/or in communication with the portable computing device 21. At step 76, the information is sent by the portable computing device 21 to the agent web service 22 to be matched with passenger data stored on the data source 26. Once a match is found, the relevant passenger travel information is retrieved from the data source 26 and displayed on the portable computing device 21 to the ticket agent 36. In one embodiment, the data that is retrieved is passenger, flight, and ticketing information, including information regarding the passenger's intended flight leaving the airport and any connecting flights for that passenger. At step 78, any messages associated with the passenger travel information stored on the data source 26 are retrieved and sent to the portable computing device 21. In one embodiment, these messages may include delay messages associated with departing flights. In another embodiment, these messages are security-related messages, such as messages indicating the passenger's selection for additional security screening.

At step 80, the ticket agent 36 uses the agent application 16 on the portable computing device 21 to view the travel upgrades, seat choices, alternate flights, and other travel offers available to the passenger. At step 82, the potential upgrades choices are presented to the passenger by the ticket agent 36. In one embodiment, these upgrade choices include boarding priority upgrades, service class upgrades, traveler lounge upgrades, meal upgrades, and other upgrades. In several exemplary embodiments, the upgrade offerings are subject to predefined parameters, tolerances and preferences that limit or restrict the electibility of certain upgrades. If the passenger desires to take advantage of the upgrade, in step 84, the ticket agent 36 uses the agent application 16 to input the upgrade. The agent application 16 then communicates with the agent web service 22 to update the passenger information stored in the data source 26 with the upgrade information. If the passenger does not request an upgrade, the process 70 moves to step 86.

In the step 86, seat assignment and potential seat change information associated with the passenger's flight is presented to the passenger by the ticket agent 36. If the passenger desires to take advantage of a seat change or does not yet have a seat assignment, in step 88, the ticket agent 36 uses the agent application 16 to indicate the seat assignment or seat change. The agent application 16 then communicates with the agent web service 22 to update the passenger information stored in the data source 26 with the seat assignment or seat change information. If the passenger does not request a seat change and already has a seat assignment, the process 70 moves to step 90.

In the step 90, the passenger presents any baggage that he or she wishes to check. In an exemplary embodiment, the ticket agent 36 stands near a scale or a baggage sizer designed to help the passenger and the ticket agent 36 determine if a certain size or weight bag must be checked under airline rules. If the passenger desires to check one or more bags, in step 92, the ticket agent 36 uses the agent application 16 to indicate the number and type of bags to check. The agent application 16 then communicates with the agent web service to 22 update the passenger information stored in the data source 26 with the check baggage information. If the passenger does not check baggage, the process 70 moves to step 94.

In the step 94, the ticket agent 36 charges the passenger for the ticket (if not pre-ticketed), upgrades, seat changes, and checked baggage (if any) using a payment method. In one embodiment, the passenger provides his credit card 37 to the ticket agent 36, and the card 37 is swiped into the portable card reader 20 that is part of and/or in communication with the portable computing device 21. The card reader 20 takes the data obtained form the magnetic stripe of the card 27 and verifies the data with a payment processor gateway in communication with the application server 14.

In other exemplary embodiments, upgrades, seat changes, and checked bags may be assigned to the passenger by the ticket agent 36 without charge, or may be purchased by the passenger by using a pre-paid deposit account or frequent flyer miles associated with the relevant passenger information stored in the data source 26.

At step 96, the portable computing device 21 sends a command to the check-in service 32 to check in the passenger for the passenger's flight. The agent web service 22 updates the data source 26 with the data generated during the process 70 for the completed check-in transaction.

At step 98, the portable computing device 21 generates a network communication, sending one or more commands to the printer 18 to print the baggage payment or fee receipt 44 for the credit card transaction (if applicable), print the one or more baggage claim tags 40 (if applicable), print the one or more baggage identification tags 42 (if applicable), and the boarding pass 46 for the passenger, all on the unitary printout 38. In an exemplary embodiment, the baggage claim tags 40, the baggage identification tags 42, the fee receipt 44, and the boarding pass 46 are printed on an adhesive label affixed to a backing strip. In one embodiment, the adhesive labels may be partially pre-printed.

In several exemplary embodiments, at the step 98, instead of, or in addition to generating a network communication to thereby send the one or more commands to the printer 18 via, for example, an open wireless protocol such as Bluetooth °, another network communication is generated that enables at least the baggage claim tags 40, the baggage identification tags 42, the baggage payment or fee receipt 44, and the boarding pass 46 to be displayed on an output device other than the printer 18 and thus viewed by the passenger. More particularly, in several exemplary embodiments, the network communication generated in the step 98 is a communication established by a telephone dialer, a communication established by an email server, a communication established by an internet server, a communication established by a voice XML, server, and/or any combination thereof, and the output device on which the baggage claim tags 40, the baggage identification tags 42, the baggage payment or fee receipt 44, and the boarding pass 46 are enabled to be displayed by the network communication is the display or other output device of a smartphone, a cell phone, a personal digital assistant, a tablet computer, or another type of computing device. In an exemplary embodiment, the display of the boarding pass 46 on the output device, which is enabled by the network communication, is subsequently scanned or otherwise read by a gate agent directly from the output device, and thus authorizes the passenger to board the airplane. In an exemplary embodiment, the display of the one or more baggage claim tags 40 on the output device, which is enabled by the network communication, is subsequently scanned or otherwise read by a baggage agent directly from the output device, so that the passenger can claim his or her associated baggage.

At step 100, the unitary printout 38 is given to the passenger. In an exemplary embodiment, the ticket agent 36 peels off the respective portions of the adhesive on which the baggage identification tags 42 are printed from the printout 38, and attaches them to the passenger's checked baggage, while the respective portions of the adhesive on which the baggage claim tags 40, the receipt 44 and the boarding pass 46 are printed remain affixed to the backing strip of the unitary printout 38. The unitary printout 38, which now includes the receipt 44, the baggage claim tags 40, and the boarding pass 46, is retained by the passenger. The boarding pass 46 authorizes the passenger to board the airplane, being used by the passenger to pass security and to present at the airport gate to board the airplane.

In several exemplary embodiments, the data on the portable computing device 21 are continuously updated by the agent web service 22 throughout the passenger's engagement time with the ticket agent 36. In some such exemplary embodiments, the varying conditions reflected by updates to the portable computing device 21 by the data source 26 result in changing flight information, and changing availability of upgrades and seats. In some such exemplary embodiments, although the process 70 focuses on one portable computing device 21 at a time and conducts a passenger check-in operation with respect to the passenger engaged with that ticket agent 36, the data that is associated with the passenger checking-in also reflects conditions and circumstances relating to other passengers' travel data. Thus, in such exemplary embodiments, any change to the travel data of the passenger will potentially cause the change in availability of certain upgrades and seat availability presented by other baggage or ticket agents 36 taking part in the process 70 with other passengers on the same flight or at the same airport.

Figure 6:
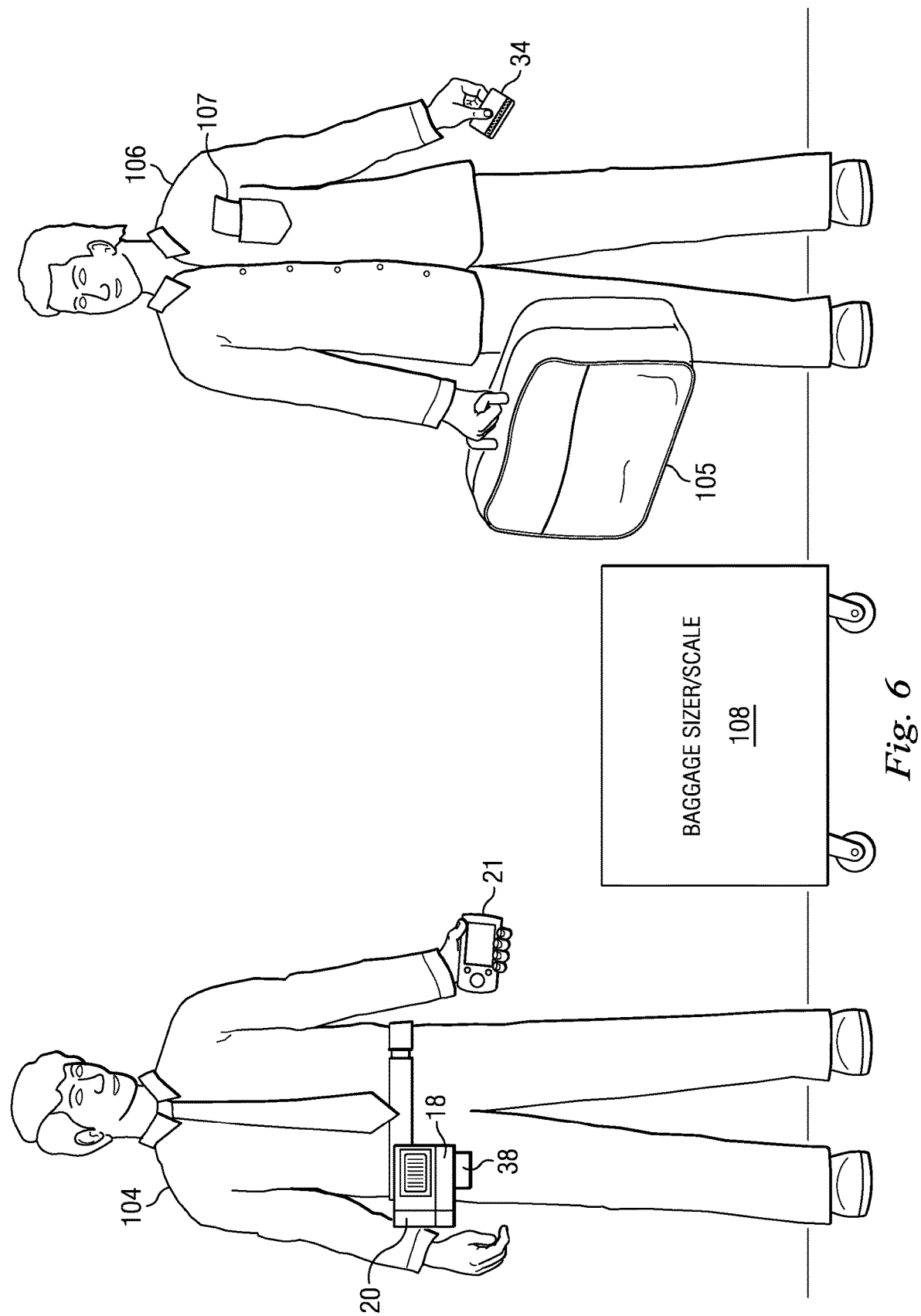
FIG. 6 is a diagrammatic illustration of at least a portion of the system of FIG. 1 according to an exemplary embodiment, the portion being controlled by a baggage agent, and including the portable computing device, the card reader, and the printer.

Referring now to FIG. 6, during operation in an exemplary embodiment, the agent application 16 loaded on the portable computing device 21 allows a baggage agent 104 to check-in baggage 105 carried by and thus associated with a passenger 106 from remote locations away from a ticketing counter or self-serve check-in kiosk. In an exemplary embodiment, the passenger 106 obtains a boarding pass 107 using a printer prior to arriving at the airport, a self-serve check-in kiosk or a ticket agent at a ticket counter and carries the boarding pass 107 with him or her to the security screening area.

The portable computing device 21 allows the baggage agent 104 to receive electronic messages, load flight information, offer upgrades, and collect baggage fees from the passenger 106. In an exemplary embodiment, the passenger 106 with the baggage 105 to check does not need to approach a ticket counter to receive a boarding pass, and instead may proceed toward the security screening area. In this exemplary embodiment, the portable computing device 21 allows the passenger 106 to check the baggage 105 and purchase upgrades without approaching a ticketing counter or self-serve kiosk.

The portable computing device 21 allows the baggage agent 104 to remotely login and logout of the agent web service 22 and the data source 26. In an exemplary embodiment, the portable computing device 21 provides the baggage agent 104 with a view of relevant passenger, ticketing, and flight data stored on the data source 26. In an exemplary embodiment, the portable computing device 21 also retrieves or accesses passenger, ticketing, and flight data stored on the application server 14. In an exemplary embodiment, the passenger, ticketing, and flight data is updated on request in near real-time from the agent web service 22 on the application server module 14. In an exemplary embodiment, the passenger data includes passenger names, passport information, visa information, club member identification numbers, passenger number records, connecting flight information, and baggage information. In an exemplary embodiment, the ticketing data includes departure times, seat assignments, gate information, messages to ticket agents about flights that are experiencing some type of disruption (such as delays, mechanical problems, or crew problems), and baggage information. In an exemplary embodiment, the flight information includes departure times, arrival times, flight plans, gate information, upgrade purchase options for passengers, and connecting passenger information.

In several exemplary embodiments, the printer 18 produces a hard copy (permanent readable text and/or graphics) of data stored in electronic form on the portable computing device, for example, on a continuous feed of adhesive label paper with a removable backing. In an exemplary embodiment, the printer 18 is attached by a printer cable or a universal serial bus cable to the portable computing device. In other exemplary embodiments, the printer 18 has a built-in network interfaces, such as a wireless interface. In an exemplary embodiment, the printer 18 creates the unitary printout 38 to be given to the passenger that contains one or more baggage claim tags, a baggage identification tag, and a fee receipt (shown in FIG. 7).

The baggage agent 104 swipes the credit card 37 provided by the passenger 106 through the card reader 20 in order to charge the passenger 106 for any ticket upgrades, seat changes, and checked baggage.

In several exemplary embodiments, a baggage sizer 108 is used to determine whether or not the dimensions of the baggage 105 exceed a certain threshold.

Figure 7:
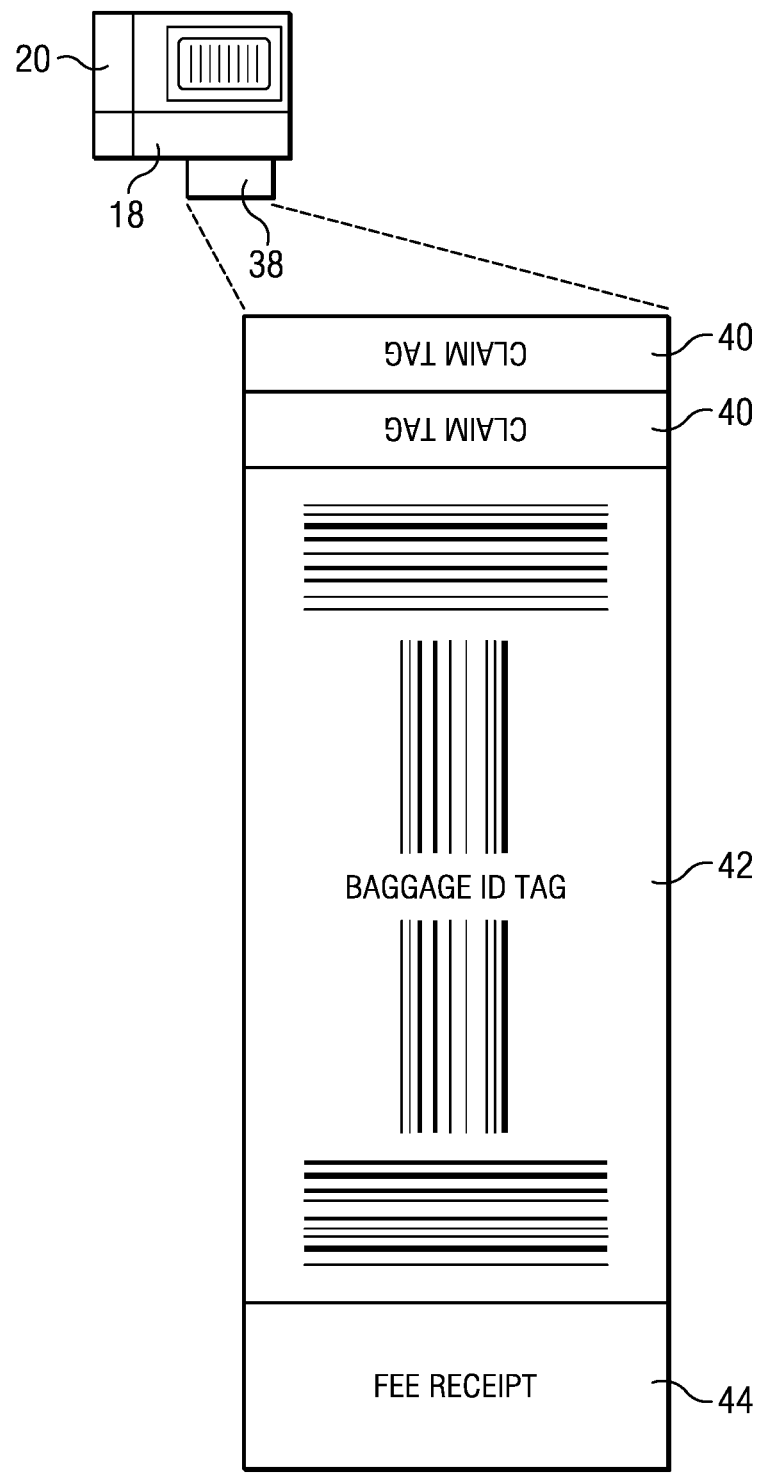
FIG. 7 is a diagrammatic illustration of the printer of FIG. 6 and a unitary printout created by the printer, according to an exemplary embodiment.

Referring now to FIG. 7, the printer 18 provides the passenger 106 with the unitary printout 38 including: the one or more baggage claim tags 40, the baggage identification tag 42, and the receipt 44. If more than one baggage piece is checked by the passenger 106, more than one baggage claim tag 40 is printed on the unitary printout 38, and the printer 18 may print additional baggage identification tags 42 on the unitary printout 38, or on separate printouts.

In several exemplary embodiments, each of the one or more baggage claim tags 40, the baggage identification tag 42, and the fee receipt 44, has machine readable code, such as a bar code, printed on them by the printer 18. In an exemplary embodiment, at least a portion of the machine readable code provides identical information when read from one of the baggage claim tags 40, the baggage identification tag 42, or the fee receipt 44. The machine readable code on the baggage identification tag 42 is designed to be scanned and read at the vehicle baggage loading point. The machine readable code on the one or more baggage claim tags 40 is designed to be scanned and read at the vehicle loading point or baggage pick-up point to match the passenger 106 with their baggage 105.

Figure 8:
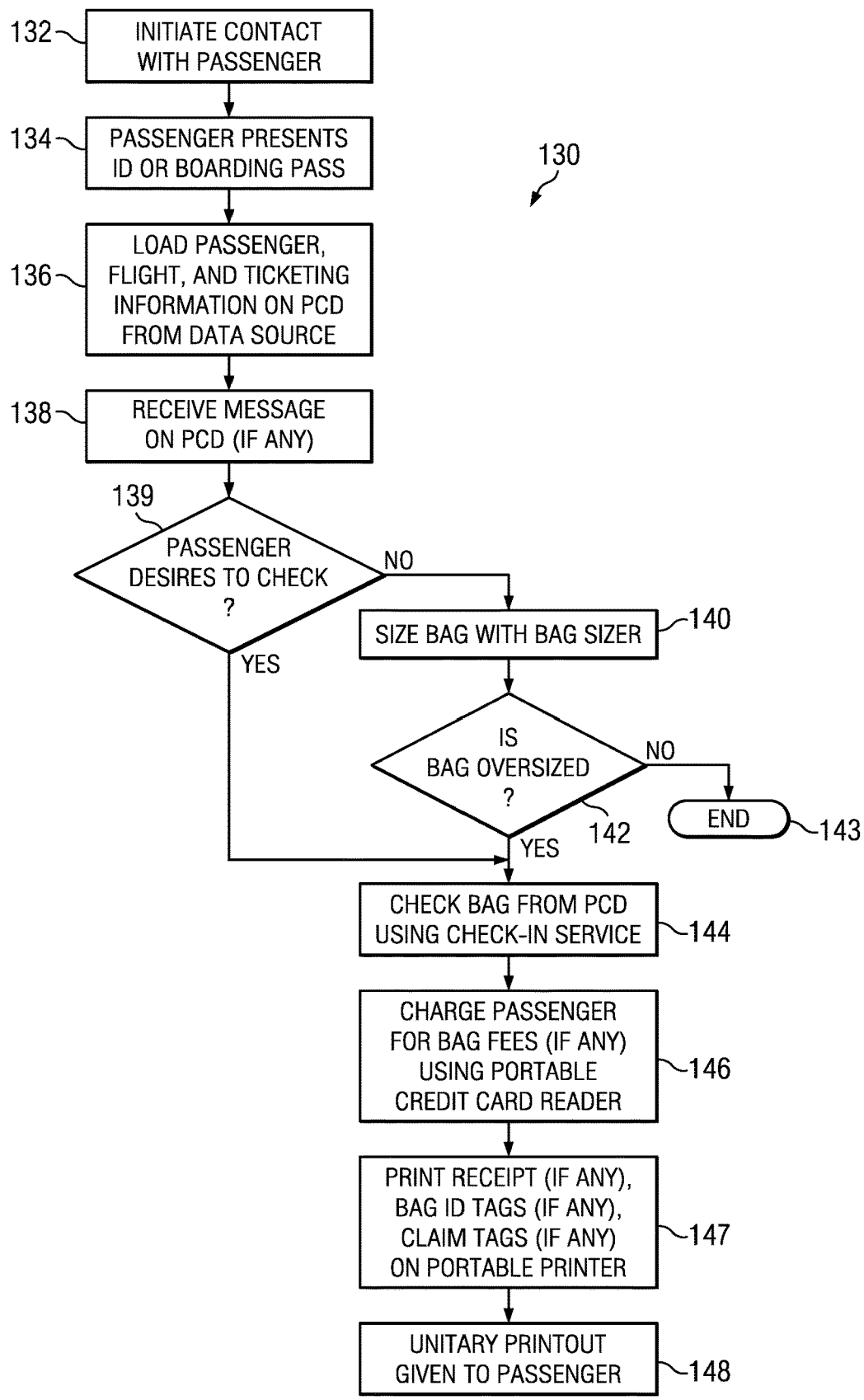
FIG. 8 is a flow chart illustration of a passenger and baggage handling process conducted using the system of FIG. 1 and the baggage agent of FIG. 6, according to an exemplary embodiment.

Referring now to FIG. 8, with continuing reference to FIGS. 1-7, an example operational process 130 for handling passengers 106 and baggage 105 for vehicle travel in one embodiment is shown. At step 132, a passenger 106 arrives at a terminal and bypasses the ticketing counter or self-self kiosk to engage the baggage agent 104 at a position in the airport. In an exemplary embodiment, the position may be prior to entering the security screening area. In another exemplary embodiment, the position may be waiting in the queue at a security screening area. In another exemplary embodiment, the position may be near the boarding area and gate.

The passenger arrives with a boarding pass 107 and may arrive with the baggage 105 to be checked or potential checked baggage 105. At step 134, the passenger 106 presents his or her boarding pass 107 or other identification to the baggage agent 104. In one embodiment, the baggage agent 104 logs onto the agent application 16 using the user interface of the portable computing device 21 and enters the passenger's identification information. In another embodiment, the passenger's identification information is scanned into the portable computing device 21 from the boarding pass 107 or other identification by a scanner that is part of and/or in communication with to the portable computing device 21. At step 76, the passenger's information is sent by the portable computing device 21 to the agent web service 22 to be matched with passenger data stored on the data source 26. Once a match is found, the relevant passenger travel information is retrieved from the data source 26 and displayed on the portable computing device 21 to the baggage agent 104. In one embodiment, the data that is retrieved is passenger, flight, and ticketing information, including information regarding the passenger's intended flight leaving the airport and any connecting flights for the passenger 106. At step 138, any messages associated with the passenger data stored on the data source 36 are retrieved from the data source 36 and sent to the portable computing device 21. In one embodiment, these messages may include delay messages associated with the relevant departing flights. In another embodiment, these messages are security-related messages, such as messages indicating the passenger's selection for additional security screening.

In step 139, the passenger 106 presents any baggage 105 that he or she wishes to check. If the passenger does not have baggage that he or she indicates a desire to check, the process 130 moves to step 140.

At the step 140, the passenger presents any baggage 105 that the baggage agent 104 requests be sized and potentially checked. In an exemplary embodiment, the baggage agent 104 stands near a scale or the baggage sizer 108 designed to help the passenger 106 and the baggage agent 104 determine if a certain size or weight of bag must be checked under airline rules. In the step 142, it is determined whether or not the baggage 105 is oversized or overweight, and must be checked according to airline rules. If the baggage 105 is not oversized or overweight, the process 130 ends at step 143. If the baggage 105 is oversized, the process 130 moves to the step 144.

If the passenger 106 has baggage 105 to check, the process 130 moves to step 144. At the step 144, the baggage agent 104 uses the agent application 16 to indicate the number of bags to check. The agent application 16 then communicates with the agent web service 22 to update the passenger information stored in the data source 26 with the checked baggage information.

In the step 146, the baggage agent 104 charges the passenger 106 for checked baggage using a payment method. In one embodiment, the passenger 106 provides his or her credit card 37 to the baggage agent 104, and the card 37 is swiped into a portable card reader 20 that is part of and/or in communication with the portable computing device 21. The card reader 20 takes the data obtained from the magnetic stripe on the card 37 and verifies the data with a payment processor gateway in communication with the application server 14. In other exemplary embodiments, checked bags may be assigned to the passenger 106 by the baggage agent 104 at no charge, or purchased by the passenger 106 by using a pre-paid deposit account or frequent flyer miles associated with his passenger information stored in the data source 26. Also at the step 146, the agent web service 22 updates the data source 26 with the data generated during the process 130 for the completed the check-in transaction.

At step 147, the portable computing device 21 sends a command to the printer 18 to print a fee receipt 44 for the passenger's credit card transaction (if applicable), print one or more baggage claim tags 40 (if applicable), and print one or more baggage identification tags 42 (if applicable) for the passenger 106 all of the unitary printout 38. In an exemplary embodiment, the baggage identification tags 42 and fee receipt 44 are printed on an adhesive label with a backing strip. In one embodiment, the adhesive labels may be partially pre-printed.

At step 148, the unitary printout 38 is given to the passenger 106. In an exemplary embodiment, the baggage agent 104 peels off the baggage identification tags 42 from the printout 38 and attaches them to the passenger's baggage 105. The unitary printout 38, which now includes the receipt 44 and baggage claim tags 40, is retained by the passenger 106.

In several exemplary embodiments, the data on the portable computing device 21 are continuously updated by the agent web service 22 throughout the passenger's engagement time with the baggage agent 104. In some such exemplary embodiments, the varying conditions reflected by updates to the portable computing device 21 by the data source 26 result in changing flight information, and changing availability of upgrades and seats. In some such exemplary embodiments, although the process 130 focuses on one portable computing device 21 at a time and conducts a passenger check-in operation with respect to the passenger 106 engaged with that baggage agent 104, the data that is associated with the passenger checking-in also reflects conditions and circumstances relating to other passenger's travel data. Thus, in such exemplary embodiments, any change to the travel data of the passenger 106 will potentially cause the change in availability of certain upgrades and seat availability presented by other baggage agents 104 or ticket agents 36 taking part in the process 70 and/or the process 130 with other passengers on the same flight or at the same airport.

Figure 9:
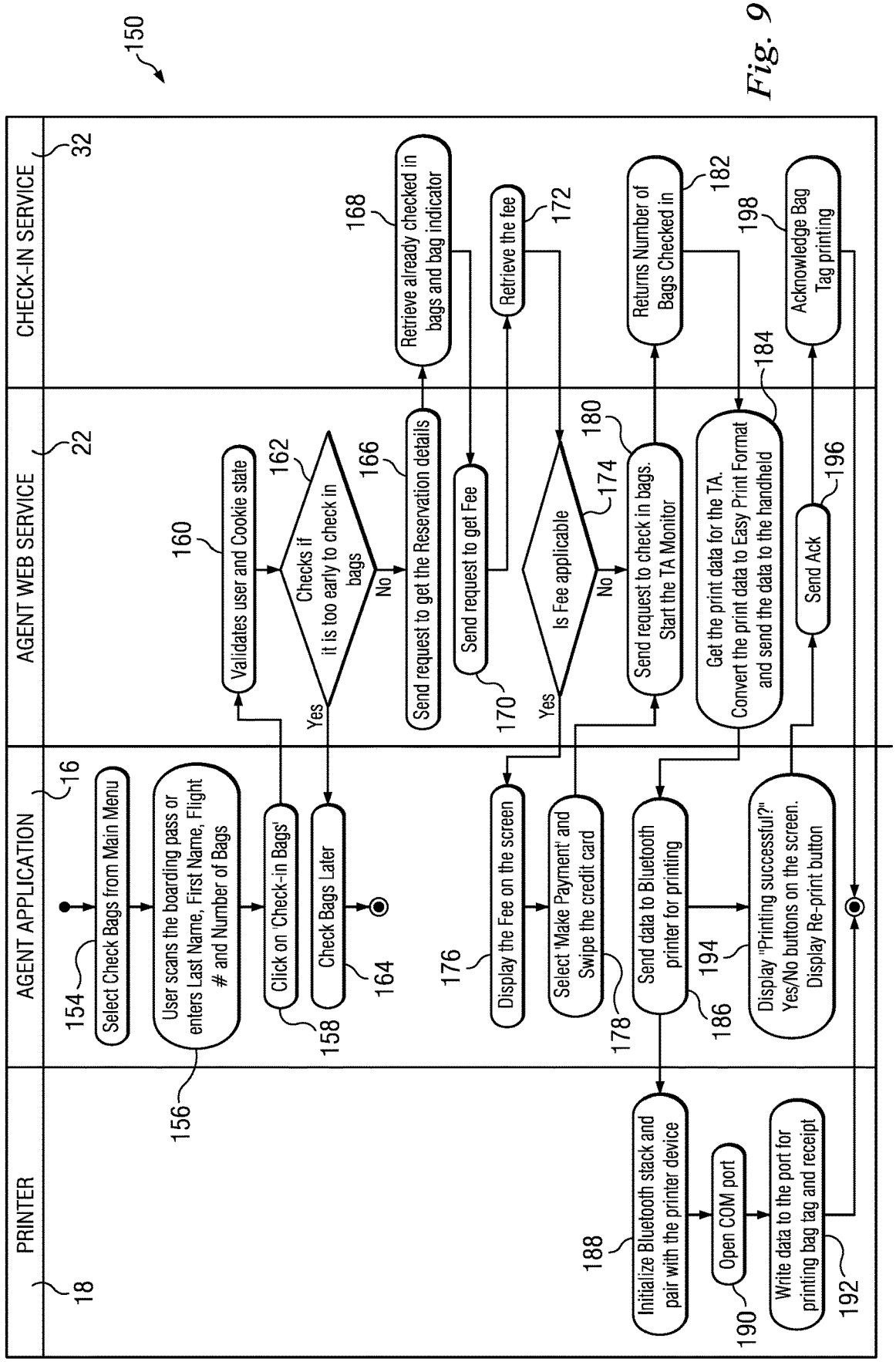
FIG. 9 is a diagrammatic illustration of the communication between the different components of the system of FIG. 1 during the process of FIG. 8, according to an exemplary embodiment.

Referring now to FIG. 9, an example operation 150 illustrating the communication between the different components of the system 10 FIG. 1 during the process 130 of FIG. 8 is shown, according to an exemplary embodiment. The portions of the operation performed by the printer 18 are shown in the first column; the portions of the operation performed by the agent application 16 are shown in the second column; the portions of the operation performed by the agent web service 22 are shown in the third column; and the portions of the check-in service are shown in the fourth column.

At step 154, the baggage agent 104 selects "Check Bags" from the main menu of the agent application on the portable computing device 21. At step 156, the baggage agent 104 scans the boarding pass 107 or other type of identification document, or enters the last name, first name, flight number, and number of bags for the passenger 106. At step 158, the baggage agent clicks "Check-In Bags" on the portable computing device 21.

At step 160, the agent application 16 sends the entered information to the agent web service 22, which validates the login of the baggage agent 104 and then verifies the proper electronic cookies on the portable computing device 21. At step 162, the agent web service 22 determines whether or not the time is too early to check in the baggage 105. If it is too early to check-in baggage 105, the operation moves to step 164. At the step 164 the operation 150 is ended to be repeated at a later time. If it is not too early to check in bags, the operation moves to step 166.

At the step 166, the agent web service 22 sends a request to the check-in service 32 to retrieve the reservation details for the passenger 106. At step 168, the check-in service 32 responds by retrieving data related to baggage already checked-in by the passenger 106 (if any). In an exemplary embodiment, the check-in service 32 retrieves this data via the data web service 30. At step 170, the agent web service 22 sends a request to the check-in service 32 to retrieve a fee. In an exemplary embodiment, the check-in service 32 retrieves this fee via the data web service 30. At step 172, the check-in service 32 provides the fee to the web service 22.

At step 174, the agent web service 22 determines whether the fee is applicable to the passenger 106. In several exemplary embodiments, the fee may not be applicable to the passenger 106 if the passenger 106 is traveling under a certain class of service, if the passenger 106 has a certain frequent flyers status, if the passenger has accrued sufficient points or miles to redeem in exchange for paying the fee, or if the baggage agent 106 decides the fee is not applicable. At step 176, the fee is displayed on the screen by the agent application 16. At step 178, the baggage agent selects "Make Payment" on the agent application 16 and swipes the credit card 34 provided by the passenger 106.

At step 180, the web service 22 sends a request to the check-in service 32 to check in the baggage 105. At step 182, the check-in service 32 confirms the number of bags checked back to the web service 22. At step 184, the web service 22 generates the print data or receives the print data associated with new baggage identification and baggage claim tags and sends the data to the agent application 16. At step 186, the agent application 16 sends the print data over a Bluetooth protocol to the printer 18.

At step 188, the printer 18 initializes the Bluetooth stack and pairs with the printing device. At step 190, the printer opens a COM port. At step 192, the printer 18 writes the print data to the COM port, producing a hard copy of the baggage identification tags, baggage claims tags, and the credit card receipt.

At the step 194, the agent application 16 displays "Printing Successful?," "Yes" and "No" buttons, and a re-print button on the screen of the portable computing device 21. At step 196, the baggage agent 104 presses the "Yes" button and the web services application 22 sends an acknowledgement to the check-in service 32.

It is understood by those having skill in the art that one or more (including all) of the elements/steps of the present disclosure may be implemented using software executed on a general purpose computer system or networked computer systems, using special purpose hardware-based computer systems, or using combinations of special purpose hardware and software.

Figure 10:
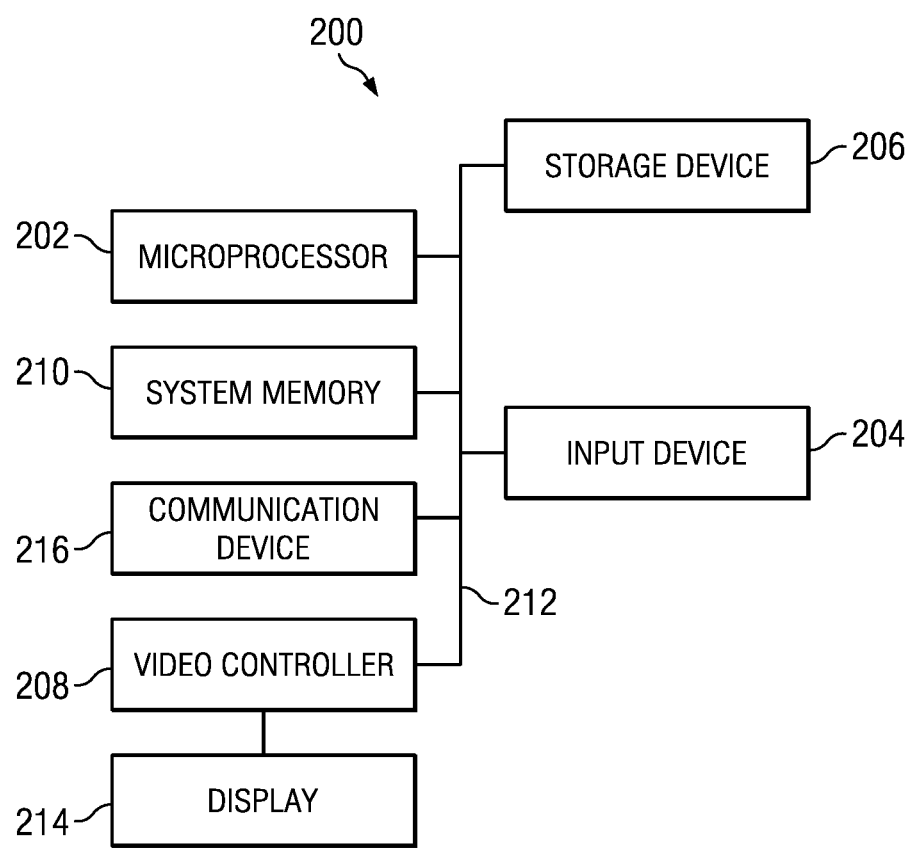
FIG. 10 is a diagrammatic illustration of a node for implementing one or more exemplary embodiments of the present disclosure.

Referring to FIG. 10, an illustrative node 200 for implementing one or more embodiments of the present disclosure is depicted. The node 200 includes a microprocessor 202, an input device 204, a storage device 206, a video controller 208, a system memory 210, an output device such as, for example, a display 214, and a communication device 216, all of which are operably coupled to one another by one or more buses 212. The storage device 206 could include any type of computer readable medium. The storage device 206 could be a floppy drive, hard drive, CD-ROM, optical drive, or any other form of storage device. In addition, the storage device 206 may be capable of receiving a floppy disk, CD-ROM, DVD-ROM, or any other form of computer-readable medium that may contain computer-executable instructions. Further, the communication device 216 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones. In several exemplary embodiments, the node 200 and/or one or more components thereof, including one or more of the microprocessor 202, the input device 204, the storage device 206, the video controller 208, the system memory 210, the display 214, and the communication device 216, and/or any combination thereof, are distributed throughout the system 10 and/or one or more components thereof, and/or any combination thereof. In several exemplary embodiments, one or more of the components of the system 10 is, includes, or is part of, the node 200 and/or one or more components thereof. The entire disclosure of U.S. application Ser. No. 12/752,625, filed Apr. 1, 2010, is hereby incorporated herein by reference.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, portable computing devices, or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the present disclosure. One example is to directly manufacture software functions into a silicon chip. Accordingly, it should be understood that combinations of hardware and software are also included within the definition of a computer system and are thus envisioned by the present disclosure as possible equivalent structures and equivalent methods.

Computer-readable mediums include passive data storage, such as a random access memory (RAM) as well as semi-permanent data storage such as a compact disk read only memory (CD-ROM). In addition, an embodiment of the present disclosure may be embodied in the RAM of a computer to transform a standard computer into a new specific computing machine.

Data structures are defined organizations of data that may enable an embodiment of the present disclosure. For example, a data structure may provide an organization of data, or an organization of executable code.

The system may be designed to work on any specific architecture. For example, the system may be executed on a single computer, local area networks, client-server networks, wide area networks, internets, hand-held and other portable and wireless devices and networks.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments. In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A printer apparatus, the printer apparatus comprising:
a portable printer, the portable printer comprising a wearable housing;
a paper medium disposed in the wearable housing, the paper medium comprising an adhesive label and a backing strip to which the adhesive label is affixed, the adhesive label defining first and second edges spaced in a parallel relation, the adhesive label comprising first, second, and third portions affixed to the backing strip, wherein each of the first, second, and third portions is permitted to be peeled off from the backing strip while the others of the first, second, and third portions remain affixed to the backing strip, wherein the first, second, and third portions each have the same width, wherein the first portion defines first and second segments of the first and second edges, respectively, the first and second segments each having the same length, wherein the second portion defines third and fourth segments of the first and second edges, respectively, the third and fourth segments each having the same length, wherein the third portion defines fifth and sixth segments of the first and second edges, respectively, the fifth and sixth segments each having the same length, wherein the first, third, and fifth segments of the first edge are co-linear and the second, fourth, and sixth segments of the second edge are co-linear, wherein the co-linear first, third, and fifth segments of the first edge are spaced in a parallel relation from the co-linear second, fourth, and sixth segments of the second edge, wherein a first one of a perforation, cut, or line is formed in the adhesive label, extends between the first and second edges of the adhesive label, and at least partially defines at least one of the first, second, and third portions, wherein a second one of a perforation, cut, or line is formed in the adhesive label, extends between the first and second edges of the adhesive label, and at least partially defines at least one other of the first, second, and third portions, wherein one of the first, second, and third portions extends between the first one of the perforation, cut, or line and the second one of the perforation, cut, or line;
a handheld computing device in communication with the printer; and
a portable card reader in communication with one, or both, of the handheld computing device and the portable printer, the card reader being configured to read a payment card;
wherein the handheld computing device comprises one or more processors, a computer readable medium having a plurality of instructions stored thereon for execution by the one or more processors, an output device, and a graphical user interface that is displayed on the output device when the instructions are executed by the one or more processors,
wherein the execution of the instructions causes the handheld computing device to retrieve passenger, ticketing, and flight data stored on an application server; and
wherein, in response to an input via the graphical user interface and based on the retrieved passenger, ticketing, and flight data, the execution of the instructions causes the handheld computing device to send a first command to the portable printer to print:

a bag payment receipt on the third portion of the adhesive label of the paper medium, the bag payment receipt evidencing a baggage fee payment made with the payment card;

a baggage identification tag on the first portion of the adhesive label of the paper medium, the baggage identification tag identifying at least one bag checked in by an airline passenger; and a baggage claim tag on the second portion of the adhesive label of the paper medium, the baggage claim tag being associated with the at least one bag checked in by the airline passenger.

2. The printer apparatus of claim 1, wherein the adhesive label comprises a fourth portion affixed to the backing strip, wherein the fourth portion is permitted to be peeled off from the backing strip while the first, second, and third portions remain affixed to the backing strip, wherein the first, second, third, and fourth portions each have the same width, wherein the fourth portion defines seventh and eighth segments of the first and second edges, respectively, the seventh and eighth segments each having the same length, wherein the first, third, fifth, and seventh segments of the first edge are co-linear and the second, fourth, sixth, and eighth segments of the second edge are co-linear, wherein the co-linear first, third, fifth, and seventh segments of the first edge are spaced in a parallel relation from the co-linear second, fourth, sixth, and eighth segments of the second edge; and wherein the handheld computing device is configured to send the first command to the portable printer to print: the bag payment receipt on the third portion of the adhesive label of the paper medium; the baggage identification tag on the first portion of the adhesive label of the paper medium; the baggage claim tag on the second portion of the adhesive label of the paper medium; and a boarding pass on the fourth portion of the adhesive label of the paper medium.

3. The printer apparatus of claim 2, wherein the first portion of the adhesive label is positioned between the second and third portions of the adhesive label, wherein the first one of the perforation, cut, or line at least partially defines the second portion, wherein the first portion extends between the first one of the perforation, cut, or line and the second one of the perforation, cut, or line, wherein the third portion extends between the second one of the perforation, cut, or line and a third one of a perforation, cut, or line, wherein the third one of the perforation, cut, or line extends between the first and second edges of the adhesive label, and at least partially defines the fourth portion of the adhesive label; and wherein, after the first command has been sent to the portable printer and the bag payment receipt, the baggage identification tag, the baggage claim tag, and the boarding pass have been printed, on the adhesive label the baggage identification tag is positioned between the baggage claim tag and the bag payment receipt, and the bag payment receipt is positioned between the baggage identification tag and the boarding pass.

4. The printer apparatus of claim 1, wherein the first portion of the adhesive label is positioned between the second and third portions of the adhesive label, wherein the first one of the perforation, cut, or line at least partially defines the second portion, wherein the first portion extends between the first one of the perforation, cut, or line and the second one of the perforation, cut, or line, and wherein the second one of the perforation, cut, or line at least partially defines the third portion; and wherein, after the first command has been sent to the portable printer and the bag payment receipt, the baggage identification tag, and the baggage claim tag have been printed, on the adhesive label the baggage identification tag is positioned between the baggage claim tag and the bag payment receipt.

5. The printer apparatus of claim 1, wherein, as the first, second, and third portions of the adhesive label are being printed on, the paper medium is fed out of the wearable housing of the portable printer.

6. The printer apparatus of claim 1, wherein the wearable housing is configured to be mounted on a belt that is worn around a user's waist.

* * * * *